(12) United States Patent
Patel et al.

(10) Patent No.: US 10,728,095 B2
(45) Date of Patent: **\*Jul. 28, 2020**

(54) CLIENT-CONFIGURED SERVER CLASS TRACING TO A CONFIGURABLE THRESHOLD

(71) Applicant: International Business Machines Corporation, Armonk, NY (US)

(72) Inventors: Devang Patel, Cary, NC (US); Matthew T. Pellas, Raleigh, NC (US); Jason M. Wicker, Pittsboro, NC (US); Ryan R. Wilson, Rolesville, NC (US)

(73) Assignee: International Business Machines Corporation, Armonk, NY (US)

( * ) Notice: Subject to any disclaimer, the term of this patent is extended or adjusted under 35 U.S.C. 154(b) by 63 days.

This patent is subject to a terminal disclaimer.

(21) Appl. No.: 15/996,258

(22) Filed: Jun. 1, 2018

(65) Prior Publication Data

US 2018/0278476 A1    Sep. 27, 2018

Related U.S. Application Data

(63) Continuation of application No. 14/849,038, filed on Sep. 9, 2015, now Pat. No. 10,003,499.

(51) Int. Cl.
| | | |
|---|---|---|
| *G06F 15/177* | (2006.01) | |
| *H04L 12/24* | (2006.01) | |
| *H04L 29/08* | (2006.01) | |
| *H04L 29/06* | (2006.01) | |

(52) U.S. Cl.
CPC .......... *H04L 41/0853* (2013.01); *H04L 67/02* (2013.01); *H04L 67/42* (2013.01)

(58) Field of Classification Search
CPC .............. G06F 11/3636; G06F 11/362; G06F 11/3624; H04L 41/0853; H04L 67/02; H04L 67/42
See application file for complete search history.

(56) References Cited

U.S. PATENT DOCUMENTS

| | | |
|---|---|---|
| 5,748,878 A | 5/1998 | Rees et al. |
| 6,083,281 A | 7/2000 | Diec et al. |
| 6,338,159 B1 | 1/2002 | Alexander, III et al. |
| 6,470,386 B1 * | 10/2002 | Combar .............. G06F 11/0709 709/224 |

(Continued)

OTHER PUBLICATIONS

IBM, List of IBM Patents or Patent Applications Treated as Related, Applicant Appendix, Jun. 1, 2018, pp. 1-2, the contents of which are incorporated herein by reference in their entirety.

(Continued)

*Primary Examiner* — Cheikh T Ndiaye
(74) *Attorney, Agent, or Firm* — Christopher M. Pignato

(57) ABSTRACT

A user-device configured server code trace request that specifies an element identifier of a specified user-device interface element served by a server device and a server code tracing depth specified by a user of a user device is received at the server device from the user device served by the server device. Using the specified element identifier, a granular server code trace of server code scoped to the specified server code tracing depth and scoped to a portion of the server code utilized in association with the specified user-device interface element is performed.

18 Claims, 5 Drawing Sheets

(56) References Cited

U.S. PATENT DOCUMENTS

| | | |
|---|---|---|
| 6,708,173 B1 | 3/2004 | Behr et al. |
| 7,392,510 B1 | 6/2008 | Treder et al. |
| 7,661,094 B2 | 2/2010 | Blevin et al. |
| 7,895,580 B1 | 2/2011 | Nikolov |
| 8,181,161 B2 | 5/2012 | Kollmann et al. |
| 8,713,438 B1 | 4/2014 | Broniek et al. |
| 2002/0087949 A1* | 7/2002 | Golender ............... G06F 9/547 717/124 |
| 2005/0132337 A1* | 6/2005 | Wedel ................. G06F 11/3636 717/128 |
| 2007/0255818 A1 | 11/2007 | Tanzer et al. |
| 2008/0148239 A1 | 6/2008 | Petrov et al. |
| 2010/0125834 A1* | 5/2010 | Matic ................. G06F 11/3624 717/125 |
| 2010/0268759 A1 | 10/2010 | Hepper et al. |
| 2012/0042037 A1 | 2/2012 | Strack et al. |
| 2012/0102466 A1* | 4/2012 | Bates ................. G06F 11/3624 717/125 |
| 2013/0111011 A1 | 5/2013 | Moulhaud et al. |
| 2014/0282417 A1* | 9/2014 | Paveza ............... G06F 11/3664 717/125 |
| 2014/0282428 A1 | 9/2014 | Andre et al. |
| 2015/0121192 A1* | 4/2015 | Kondepudi ........... G06F 16/957 715/234 |
| 2017/0070392 A1 | 3/2017 | Patel et al. |

OTHER PUBLICATIONS

Author Unknown, Method to centrally collect and manage client-side logging and traces generated by a web application, Technical Disclosure IPCOM000194421D, Mar. 23, 2010, pp. 1-6, IP.com, Published at: http://ip.com/IPCOM/000194421.

United States Patent and Trademark Office, Office Action for U.S. Appl. No. 14/849,038, dated Aug. 25, 2017, pp. 1-15, Alexandria, VA, USA.

United States Patent and Trademark Office, Notice of Allowance for U.S. Appl. No. 14/849,038, dated Feb. 16, 2018, pp. 1-8, Alexandria, VA, USA.

United States Patent and Trademark Office, Corrected Notice of Allowabiliyt for U.S. Appl. No. 14/849,038, dated Mar. 19, 2018, pp. 1-2 Alexandria, VA, USA.

* cited by examiner

CLIENT-CONFIGURED SERVER CLASS TRACING TO A CONFIGURABLE THRESHOLD

BACKGROUND

The present invention relates to debugging of complex cross-platform applications. More particularly, the present invention relates to client-configured server class tracing to a configurable threshold.

Client devices within a client-server environment may access and utilize web pages or applications provided by one or more servers. The client devices may utilize a browser or similar client application interface to access and utilize the web pages or applications provided by the server(s).

SUMMARY

A computer-implemented method includes: receiving, at a server device from a user device served by the server device, a user-device configured server code trace request that specifies an element identifier of a specified user-device interface element served by the server and a server code tracing depth specified by a user of the user device; configuring, using the specified element identifier, a granular server code trace of server code scoped to the specified server code tracing depth and scoped to a portion of the server code utilized in association with the specified user-device interface element; and performing the configured granular server code trace of the server code scoped to the specified server code tracing depth and scoped to the portion of the server code utilized in association with the specified user-device interface element.

A system that performs the computer-implemented method and a computer program product that causes a computer to perform the computer-implemented method are also described.

DETAILED DESCRIPTION

Figure 1:
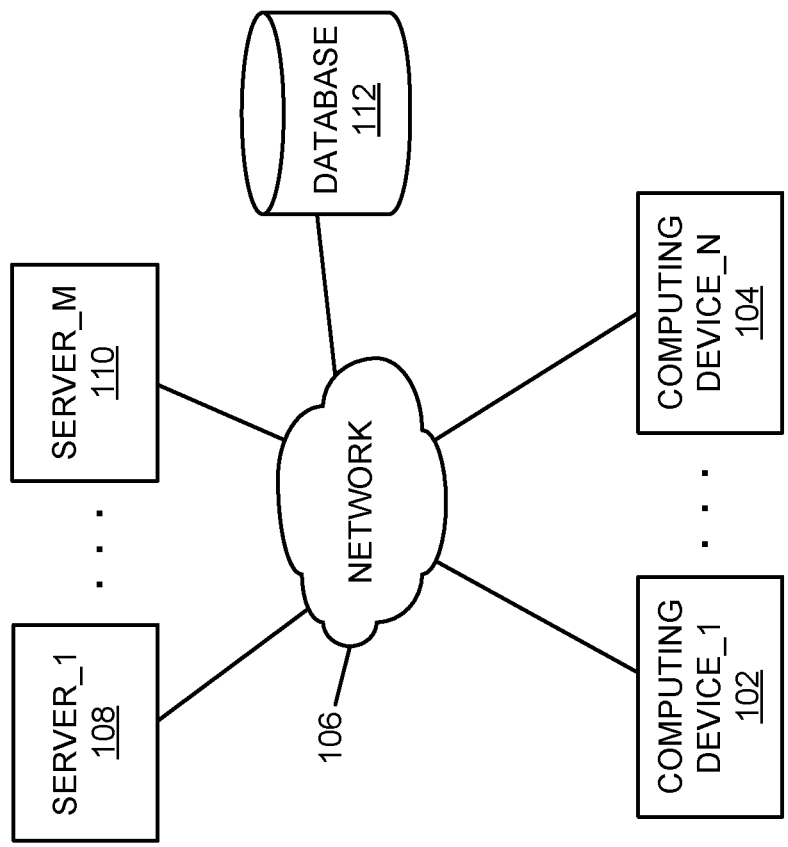
FIG. 1 is a block diagram of an example of an implementation of a system for client-configured server class tracing to a configurable threshold according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides client-configured server class tracing to a configurable threshold. The present technology solves a recognized problem associated with debugging web-based applications or web pages that utilize code that operates at least partially on a server device across a network (e.g., the Internet) by providing technology that includes a new form of computational processing within complex client-server computing environments. The technology described herein allows a user of a client-side device to specify an interface element of the client-side interface and to invoke class tracing to a configurable class depth/threshold of code associated with the client-side element that is executing at the respective server. The server-side code is traced relative to the specified element including any imported code portions as specified by the configured class depth/threshold. As such, the technology described herein provides an element-level granularity of tracing that does not involve tracing of entire package entities, but that instead traces classes within package entities that are utilized directly by code related to the specified client-side element. Accordingly, improved issue resolution within complex client-server processing domains may be achieved by use of the technology described herein.

The technology described herein operates by receiving, at a server device from a user device served by the server device, a user-device configured server code trace request that specifies an element identifier of a specified user-device interface element served by the server and a server code tracing depth specified by a user of the user device. A granular server code trace of the server code scoped to the specified server code tracing depth and scoped to a portion of the server code utilized in association with the specified user-device interface element is configured using the specified element identifier. The configured granular server code trace of the server code scoped to the specified server code tracing depth and scoped to the portion of the server code utilized in association with the specified user-device interface element is performed.

To assist with understanding of the detailed example that follows further below, as a preliminary foundation, the technology described herein may be used to obtain a baseline information set that documents scoped server operations associated with particular client interface components (e.g., for comparison in the event of a later-detected anomaly) and may be additionally used to perform scoped server-side debugging of actual anomalies/errors. The majority of the examples described below are related to the latter pattern of use (e.g., debugging) to reduce complexity of the description herein, with the understanding that capturing baseline operations may be performed in the same manner as the examples described below and that comparison of scoped baseline server-side operations with actual scoped server-side debug traces may further assist debugging efforts.

As such, it may be presumed for purposes of the examples that follow that a client-side end user (e.g., a user of a client-side device such as a customer, content subscriber, etc.) of a web application/web page may detect that something is not functioning within their user interface according to what they may expect. For example, the client-side end user may recognize that a picture/image on a web page is not being rendered and that an error appears related to the missing image. The client-side end user may not know the source of the picture/image or how it is supposed to be rendered, and may only know that the web page is not operating as intended by the administrators and/or developers. Similarly, the administrators may be unable to recreate this issue within the development environment, and may be unable to trace the issue with granularity at the element level due to package partitioning debug constraints within the server-side development environment. The technology described herein allows the developer to prompt the client-side end user to provide granular element-level tracing input to the server for the administrators to review or for support teams to utilize for diagnostics without the client-side end user having to know anything about the product architecture itself or having to have any particular skill programming/development set(s). The terms "client-side" and "user device," and similar related terms, are used interchangeably herein to refer to the application or web page content consumer interface that is trying to utilize content served by one or more servers.

To initiate client-invoked server tracing and debugging of a web-based application, the client-side end user may utilize a "select element" browser debug tool to select the area of a web page that is of interest or concern, such as a user-device interface element associated with the web-based application (e.g., a portlet, image, etc.). When an area or element of a web page is selected, the user may be programmatically provided with a pop-up dialog box that asks whether the user would like to trace server-side code of the selected area or element, and to what level of depth/threshold the server-side tracing is to be performed. The developer may provide the user with a requested level of depth/threshold to enter, and responsive to user entry of the requested information, the web-based application code for that area or element may then be traced at the server. As such, the server-side code that implements or provides the specified user-device interface element may be traced based upon the user-designated threshold and with a granularity that is scoped to the specifically-selected element of the portlet.

To invoke the actual trace of the element, the user-designated threshold and element identifier associated with the element may be programmatically configured within a header on the web page. An indication to enable tracing of the user-selected element to the configured threshold/depth may also be specified within the header of the web page. The web page may then be refreshed from the server after addition of the user-designated threshold and element identifier to the web page.

The refresh operation from the server may be performed using an application programming interface (API) call to the client device with a web page identifier and an instruction to the client device that causes the client device to refresh the identified web page or the selected element. In response to the API instruction, the client device refreshes the identified web page or the selected element, and tracing may begin at the server of the server code utilized in association with the specified user-device interface element.

As such, the actual code (e.g., the markup language page) may be updated with the specified threshold depth and an element identifier of the user-selected element for debug and re-executed (e.g., refreshed under server control to process the user-designated threshold and element identifier within the header of the markup language page). Alternatively, similar processing may be performed to refresh the specific element on the web page depending upon the implemented caching strategy at the client/user device. A server class trace may be captured during that re-execution of the server code at a granularity of the client-side selected element to the configured tracing depth. A dynamic trace of the server code may be provided in a trace log file defined for the particular web-based application/service.

Examples of areas of server code that may be traced according to the technology described herein may include portlets, widgets, images, web content, and other coded aspects of web pages that may loaded from, executed on, or executed in conjunction with code executing at a server. Again, the class tracing may be performed in a granular manner according to the element selected at the client device.

It should be noted that certain implementations may utilize administrator (e.g., developer) approval/authorization to invoke the server class tracing. Within such an implementation, if the end user selects a pop-up dialog and requests server class tracing, in addition to specifying the trace level/depth, the pop-up dialog may notify the appropriate administrator and issue a request to the administrator to give the end user appropriate access rights to start the server code tracing and logging. In response to the request, the administrator may provide the requested access rights and the re-execution (e.g., refresh) of the page may be performed.

As a further example of server class tracing that may be performed as described herein, it may be presumed that a portlet throws an error during operation. The end user may select an "inspect element" feature within the user's browser to inspect the element "Portlet." A pop-up dialog may be generated that requests confirmation that the end user would like to initiate a trace of the portlet code at the server, with an input area for the end user to specify a threshold of how many layers deep the trace is to be performed. The element identifier of the portlet may be captured programmatically in association with the select operation. The end user may enter the trace threshold and confirm the trace of the selected element according to the user-specified trace level specified within the pop-up dialog. In response to initiating the trace, the portlet code along with the underlying portlet container, theme, skin, and other code may be traced according to the user-specified trace threshold.

Further regarding tracing according to the user-specified depth, the trace may begin/start at the Java™ programming language class' parent package name and go back within the code layers from that beginning level. As such, if the package was "<<com. . . . . portal.portlets.myportlet>>" and the user-specified threshold was two (2) deep, the tracing traces all classes under "<<corn portal.portlets.*>>" along with any parent class packages at the same threshold. For example, "<<com . . . ws.portletcontainer.*>>" may be traced as well.

It should also be noted that, within these examples, the double arrow brackets (e.g., <<and>>) are used to differentiate traversable character sequence links according to certain limitations placed upon formalities associated with the present document. As well, ellipsis dots are used to further avoid inadvertent creation of a navigable uniform resource identifier (URI) or link within the examples provided in this document. However, it is understood that a person of skill may implement the technology described herein using actual navigable links (e.g., hyperlinks) based upon the teachings herein.

Returning to the description of the present example, the portlet container (e.g., "ws.portletcontainer") represents an imported container class that may be imported into the code of the portlet. As such, this imported code may also be traced to the level/depth specified by the client-side user. Again, the code that is traced may be granularly traced from the element reference rather than tracing all code in the imported container. Accordingly, the technology described herein provides tracing capabilities that bridge code packaging boundaries and that are granular according to the element selection by the client-side user.

Regarding alternatives for implementation of the present technology, the client-specified server tracing technology described herein may be invoked in a variety of manners. For example, the technology may be accessed at the client device by interfacing with the inspect element feature of a browser debugger. Such an inspect feature may be configured to allow an end user to select a specific element on a web page and cause server-side code tracing to drill down inside the markup language (ML) generated by the code for that element to the specified depth/level. This element may be any element on the web page, such as a banner, a portlet container, portlet content, an image, or other element.

By configuring and confirming the trace within the pop-up dialog, a Java™ programming language hook to the logger may be implemented that takes as input a unique identifier (ID) of the element the end user has selected to trace. The unique ID may be stored as a Javascript® attribute on the client side. This unique ID may have a one-to-one (e.g., 1:1) relationship with the item the end user has configured to be traced.

For example, a portlet's unique ID inside the portal may be used. The portlet's unique ID may be stored and may be located within the extensible markup language (XML) view of a portal page. Alternatively, if the element is located on another website, another unique identifier may be used, such as a markup language container identifier of the element itself (e.g., DIV identifier or other identifier that identifies an element referenced from within the markup language). The trace that is generated may be provided directly back to the administrators because the hook is located at the server level, and by confirming the trace within the pop-up dialog, the end user may provide the authority to dynamically trace the element via server tracing.

In an alternative implementation example of using a Websphere® application server (WAS) Portal, each element on the web page may have some Java™ programming language or Javascript® code path, such as "<<com portal.myportlet>>." Other classes may also be used by the selected element. As such, when the trace is confirmed by the end user within the pop-up dialog with a configuration of how many layers deep to trace, this information may be passed to the tracing code that turns on the trace at that level for that specific code. The log output (e.g., SystemOut.log, trace.log files, etc.) may start logging out the detailed traces for the specific classes associated with the specific selected element on the web page.

The technology described herein may also implement security in association with the server code tracing by use of configuration information that specifies whether a particular end user is a valid/authorized end user to the site with the correct access control lists (ACLs) to allow the end user to push the call to trace the portlet to the server in the above example. The portal administrator may utilize an impersonation feature for this as well, where an end user that does not have rights may do the above client-side processing to invoke the trace of the portlet, which may be configured to generate a request that may be sent to the administrator to allow impersonation for the call to invoke the trace.

To further alleviate security concerns, it should be noted that the tracing of an element on the web page may be configured to prevent a client-side end user from seeing any non-public (e.g., confidential) portion of the web page/code during the real-time trace. The server logs may be investigated by a system administrator with the appropriate authorization to view the logs. As such, an administrator may request a client-side end user to invoke a trace from the end-user interface, and viewing of the results of the trace of the server-side code within the client-side configured trace level may be limited to the administrator or other authorized individuals.

Within the example described above, if the end user at the client-side computing device is not an administrator and is a normal end user (e.g., a customer), the end user may inspect the element in the same way described above, which may trigger an impersonation request to the administrator via multiple forms of communications (e.g., electronic mail, text message, social media, etc.). If the administrator approves the request, the trace may then start running. In this case, the administrator may be in contact with the end user to approve the trace while the issue is happening.

To further the examples provided above, in response to invocation of a trace, the application code of the web application may look for an event listener call that is for an inspect element call from the browser. By combining this extension of an event listener, which may be integrated with the browser, with a server-side library, PHP: Hypertext Preprocessor (PHP) scripts may send debugging information to the browser encoded in the hypertext transfer protocol (HTTP) response headers. Once the tracing is configured, warnings and errors in the PHP scripts may be logged to the browser console. As such, the scripts themselves may be encoded to add additional debugging information into the browser/logs.

As such, real-time tracing of a particular area of code that is of interest or of an issue/anomaly experienced by the end user may be performed to the configured tracing level across platforms (e.g., invoked at the client and performed on the server) under circumstances where an administrator may otherwise be unable to replicate the particular behavior or issue within a development environment. Further, the granularity by which the tracing may be invoked from the client side (where the issue is recognized by the client-side user) provides flexibility that seamlessly integrates tracing at the server-side platforms related specifically to the client-side selected element. Accordingly, improved debugging, operation, and reliability of web-based applications may be achieved by use of the technology described herein.

It should be noted that conception of the present subject matter resulted from recognition of certain limitations associated with class tracing in complex client-server environments. For example, it was observed that prior technologies for debugging of client-side applications that utilize imported portions of server-side code (e.g., classes) did not provide any mechanism by which an end user of the client-side applications may invoke debugging from the client-side execution environment to be executed within the server-side execution environment. As a result, developers of client-server technologies were unable to granularly generate traces of classes used to support content provided to the client-side execution environment, which resulted in a lack of information regarding execution of granular areas of interest within the server code or regarding problems that may exist regarding the complex interactions and operations between the various components of the client-server technologies. It was further observed that server-side invocation of logging features was constrained to tracing package level code entities, which produced large outputs and did not provide tracing granularity at a user-interface element level. It was determined from these observations that new technology that provides capabilities to initiate a trace from the client side of an exact area in the code from the user-interface element on a web page (portlet, banner, etc.) may provide both improved granularity of tracing at the server, and may provide manageable trace information sets, such as to obtain a baseline information set that documents scoped server operations associated with particular client interface components for comparison in the event of a later-detected anomaly and/or to expedite resolution of issues. Further, it was determined that client-side control to provide a precise trace to a support team (internal or external to the customer) based upon a header threshold value and element specification may further provide for granularity that may be selected at a client-side machine to invoke class-level threshold-based tracing across the physical platforms from the client to the server side of such systems. The present subject matter improves debugging of issues related to complex client-server technologies by providing for client-configured server class tracing to a configurable threshold, as described above and in more detail below. As such, improved client-server system debugging may be obtained through use of the present technology.

The client-configured server class tracing to a configurable threshold described herein may be performed in real time to allow prompt client-side invocation of cross-platform debugging. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for client-configured server class tracing to a configurable threshold. A computing device_1 102 through a computing device_N 104 communicate via a network 106 with several other devices. The other devices include a server_1 108 through a server_M 110. A database 112 provides storage for information, such as for tracing log files and other information within the system 100.

As will be described in more detail below in association with FIG. 2 through FIG. 5, the computing device_1 102 through the computing device_N 104 and the server_1 108 through the server_M 110 may each provide automated client-configured server class tracing to a configurable threshold. The automated client-configured server class tracing to a configurable threshold is based upon client-side specification and invocation of a trace that is performed to the specified tracing level beginning at the client-device end-user interface level and continuing to the server device, in accordance with the location of the respective layers of code that are executed during the trace down to the configured level of tracing. As such, the present technology operates to perform integrated tracing of web pages that is configured and initiated at an end-user computing device and performed using server device level tracing functionality. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device.

The database 112 may include a relational database, an object database, or any other storage type of device. As such, the database 112 may be implemented as appropriate for a given implementation.

Figure 2:
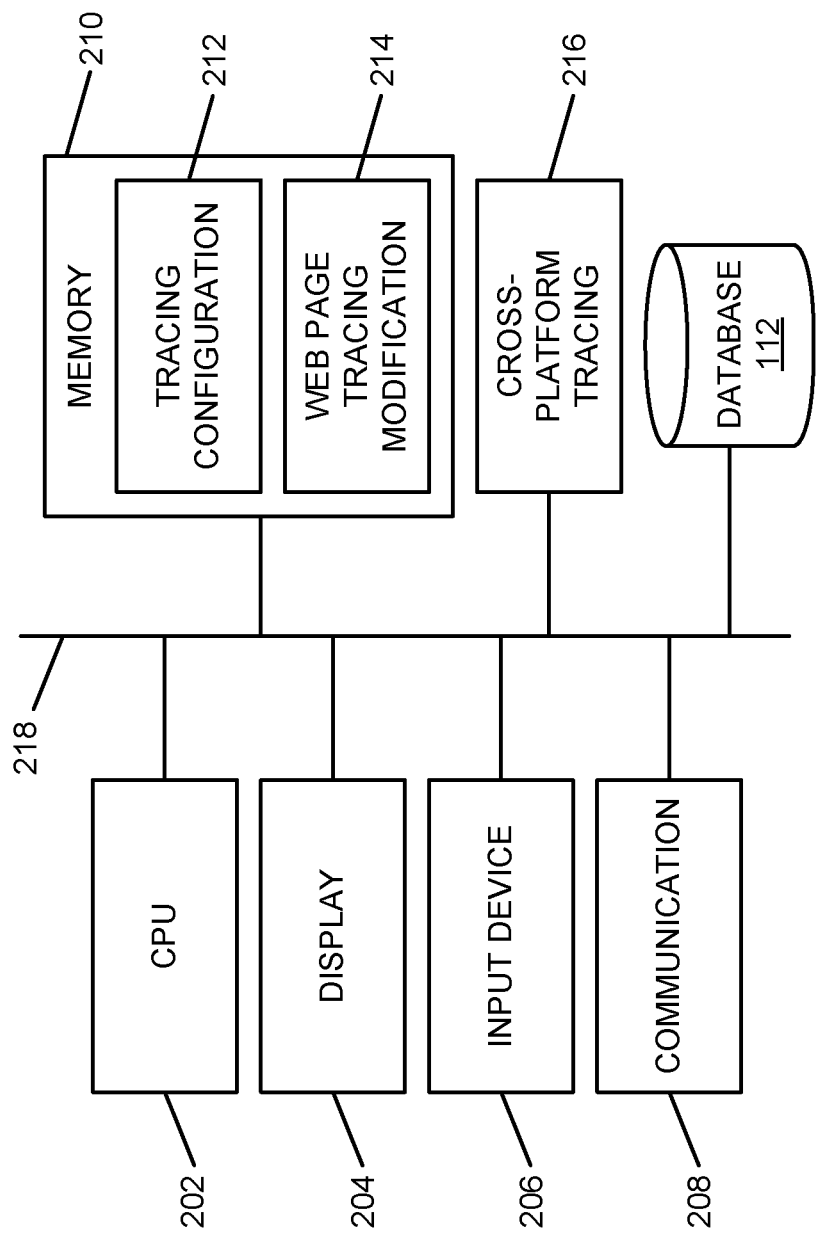
FIG. 2 is a block diagram of an example of an implementation of a core processing module capable of performing client-configured server class tracing to a configurable threshold according to an embodiment of the present subject matter.

FIG. 2 is a block diagram of an example of an implementation of a core processing module 200 capable of performing client-configured server class tracing to a configurable threshold. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein as appropriate for a given implementation.

Further, the core processing module 200 may provide different and complementary processing of cross-platform tracing in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a tracing configuration storage area 212 that stores tracing configuration information associated with traces, such as unique code element identifiers (IDs) of web page elements that are configured to be traced and a user-configured tracing threshold/level to which the cross-platform tracing is to be performed by the core processing module 200. As will be described in more detail below, the tracing configuration stored within the tracing configuration storage area 212 is used to initiate traces of web pages including code that is local to the client device and code that executes at the server device.

A web page tracing modification storage area 214 provides storage for web pages at a client device, and also provides storage for modifications to web page code. As described above, the web page code/markup language may be modified to place tracing configuration information within the code, such as by page header modifications that identify the tracing level/threshold, that identify tracing is enabled, and other information to support cross-platform tracing as appropriate for the given implementation. The modified web page code may be refreshed within a client-side browser to initiate the cross-platform tracing.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A cross-platform tracing module 216 is also illustrated. The cross-platform tracing module 216 provides support for client-side configuration of cross-platform tracing, and provides server-side support for client-side invoked tracing of server code, for the respective implementations of the core processing module 200, as described above and in more detail below. The cross-platform tracing module 216 implements the automated client-configured server class tracing to a configurable threshold of the core processing module 200.

It should also be noted that the cross-platform tracing module 216 may form a portion of other circuitry described without departure from the scope of the present subject matter. The cross-platform tracing module 216 may form a portion of an interrupt service routine (ISR), a portion of an operating system, or a portion of an application without departure from the scope of the present subject matter. The cross-platform tracing module 216 may also include an embedded device with circuitry designed specifically to perform the processing described herein as appropriate for a given implementation.

The database 112 is again shown within FIG. 2 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the cross-platform tracing module 216, and the database 112 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor (s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 3:
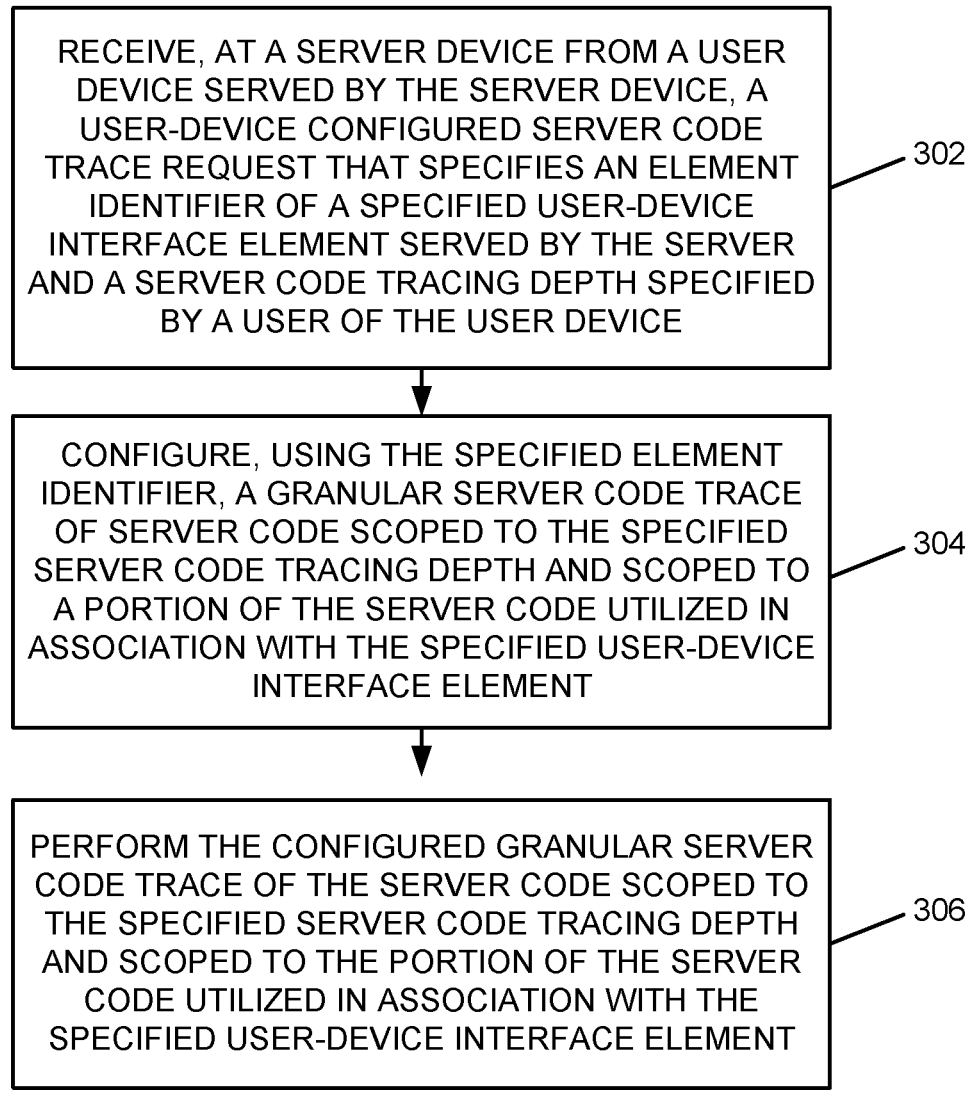
FIG. 3 is a flow chart of an example of an implementation of a process for client-configured server class tracing to a configurable threshold according to an embodiment of the present subject matter.
Figure 4:
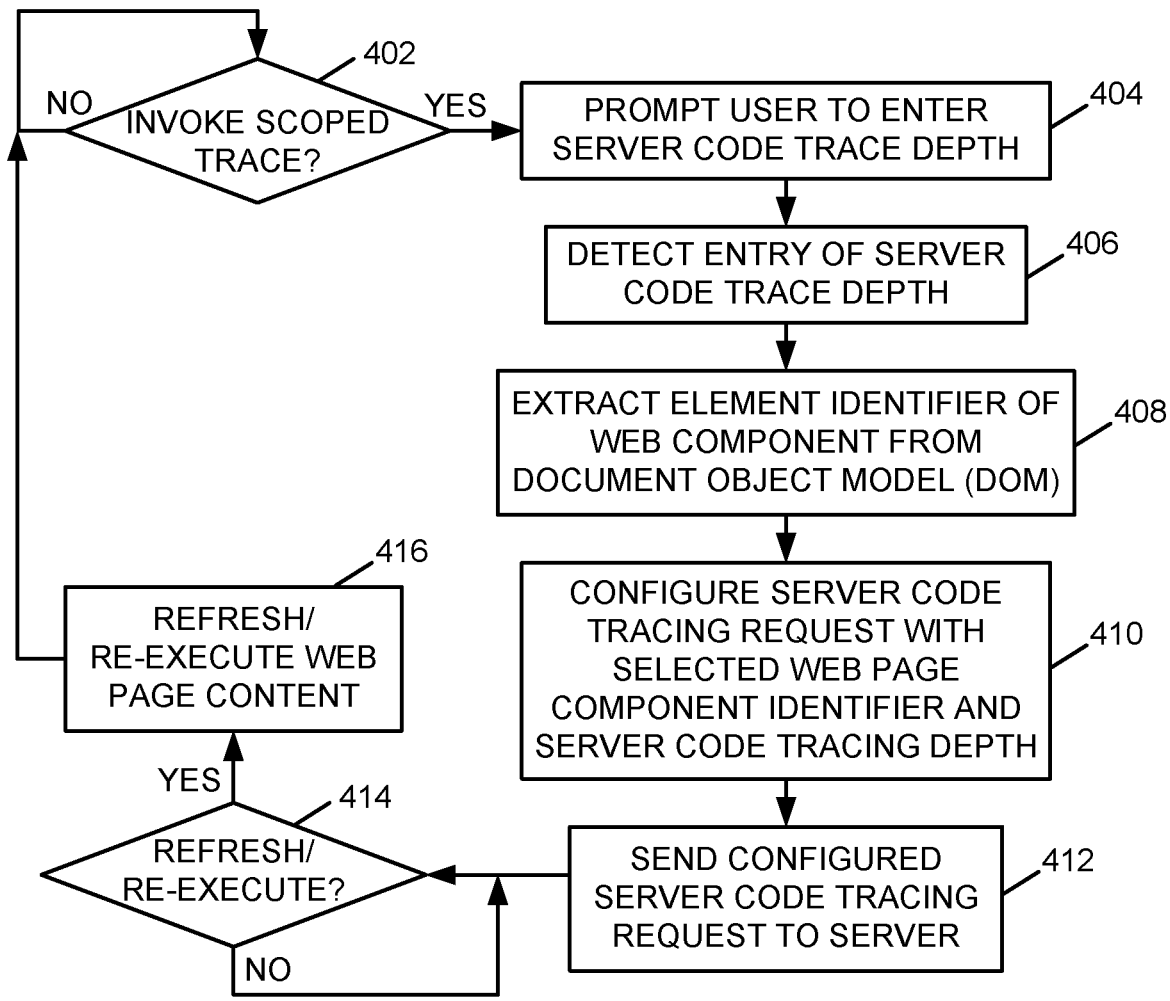
FIG. 4 is a flow chart of an example of an implementation of a process for end user-device processing associated with client-configured server class tracing to a configurable threshold according to an embodiment of the present subject matter.
Figure 5:
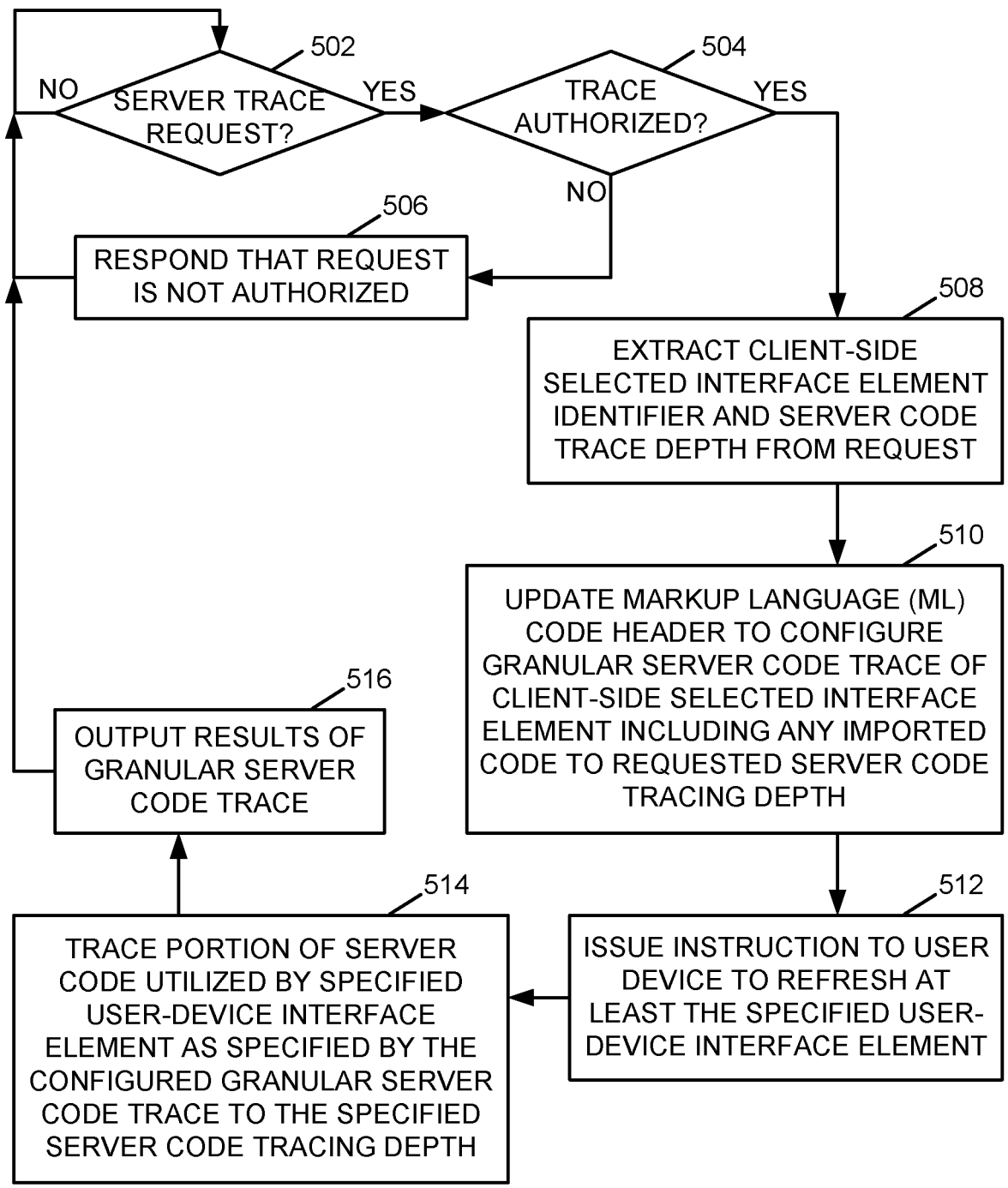
FIG. 5 is a flow chart of an example of an implementation of a process for server-device processing associated with client-configured server class tracing to a configurable threshold according to an embodiment of the present subject matter.

FIG. 3 through FIG. 5 described below represent example processes that may be executed by devices, such as the core processing module 200, to perform the automated client-configured server class tracing to a configurable threshold associated with the present subject matter. Many other variations on the example processes are possible and all are considered within the scope of the present subject matter. The example processes may be performed by modules, such as the cross-platform tracing module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for client-configured server class tracing to a configurable threshold. The process 300 represents a computer-implemented method of performing the subject matter described herein. At block 302, the process 300 receives, at a server device from a user device served by the server device, a user-device configured server code trace request that specifies an element identifier of a specified user-device interface element served by the server and a server code tracing depth specified by a user of the user device. At block 304, the process 300 configures, using the specified element identifier, a granular server code trace of server code scoped to the specified server code tracing depth and scoped to a portion of the server code utilized in association with the specified user-device interface element. At block 306, the process 300 performs the configured granular server code trace of the server code scoped to the specified server code tracing depth and scoped to the portion of the server code utilized in association with the specified user-device interface element.

FIG. 4 is a flow chart of an example of an implementation of a process 400 for end user-device processing associated with client-configured server class tracing to a configurable threshold. The process 400 represents a computer-implemented method of performing the subject matter described herein. At decision point 402, the process 400 makes a determination as to whether to invoke a scoped trace of server code from a client-side device. For example, the process 400 may detect a select element debug feature in association with a web component by a user of a client-side interface. As described above, an end user may select (e.g., right click with an input device, such as a mouse) the web component/element either for informational/baseline scoped tracing of server-side code or for scoped tracing of server-side code in association with a web page component anomaly (e.g., an area of a web page/application where an image is not being rendered, or other anomaly). Alternatively, the process 400 may determine that a web page component error has occurred, such as by detection of an exception thrown by a web page or element of web page content. As such, the process 400 determine to invoke a scoped trace of server code, such as for documentation of execution flow of a working component that may be used as a comparison/baseline in the event the component is ever determined not to be working as intended, or in response to detected errors associated with web page components.

At block 404, the process 400 prompts the end user (e.g., using a dialog box) to enter a server code tracing depth. The server code tracing depth specifies a granular and configurable level/depth of tracing of a portion of code utilized at the server that is intended to render the web component. The code tracing depth may be specified by an administrator in response to communications with the end user of the user/client-side device. Alternatively, the end user may independently specify the server code tracing depth and issue a tracing request.

At block 406, the process 400 detects entry of the server code tracing depth. At block 408, the process 400 extracts an element identifier (ID) of the web page component from a document object model (DOM) of the web page content. At block 410, the process 400 configures a server code tracing request with the selected web page component identifier (ID) and the server code tracing depth entered by the user.

At block 412, the process 400 sends the configured server code tracing request to the server that hosts the web page/application. Programmatic processing may be performed at the server to determine whether the server code tracing request is authorized for the particular user/device, as described in more detail below. Alternatively, an administrator may receive the server code tracing request and determine whether to authorize the request for the particular web component in response to receiving the server code tracing request.

At decision point 414, the process 400 makes a determination as to whether an instruction to refresh/re-execute the web page/application has been received from the server. As also described above, the server may issue an instruction to the end-user device to refresh at least the specified user-device interface element within a browser executed by the end-user device. The instruction may be implemented as an application programming interface (API) call to the end-user device with a web page identifier of a web page that includes the specified user-device interface element with an instruction to the end-user device that causes the client device to refresh the identified web page. For purposes of the present example, it is presumed that an instruction to refresh at least the specified user-device interface element within a browser executed by the end-user device is received, and that any authorization has been performed by the server device.

In response to a determination at decision point 414 that an instruction to refresh/re-execute the web page/application has been received from the server, the process 400 refreshes/re-executes the web page/application content at block 416. The refresh/re-execution of the web page/application content initiates scoped tracing of the portion of the server code tracing as configured by the user/client device. The process 400 returns to decision point 402 and iterates as described above.

As such, the process 400 allows an end user of a client-side interface to configure scoped server code tracing of individual portions of server code that support and that are utilized in association with particular components/elements of content. The end user may specify a configured threshold/depth of the scoped server code tracing (e.g., as requested by an application developer for purposes of scoped debugging to an appropriate depth), and an updated markup language page may be received that invokes granular server code tracing in response to a refresh/re-execution of the content.

FIG. 5 is a flow chart of an example of an implementation of a process 500 for server-device processing associated with client-configured server class tracing to a configurable threshold. The process 500 represents a computer-implemented method of performing the subject matter described herein. At decision point 502, the process 500 makes a determination as to whether a server code trace request has been received from a user/client device that utilizes code hosted at least in part by the server that executes the process 500. In response to determining that a server code trace request has been received from a user/client device, the process 500 makes a determination as to whether the received request is authorized at decision point 504. For example, programmatic processing may be performed to determine whether the user/device that issued the request is pre-configured/pre-authorized to issue server code trace requests. Alternatively, an administrator may be queried and may approve or decline the server code trace request.

In response to determining that the received server code trace request is not authorized at decision point 504, the process 500 responds with an indication that the request is not authorized at block 506, and returns to decision point 502 and iterates as described above. As such, where an end user requests a server code trace that is not programmatically or otherwise authorized, the end user may subsequently be instructed/notified to request authorization from the appropriate entity.

Returning to the description of decision point 504, in response to determining that the received server code trace request is authorized, the process 500 extracts a client-side selected interface element identifier (ID) and a server code tracing depth from the server code trace request at block 508. At block 510, the process 500 updates a markup language (ML) code header of source code that serves the specified user-device interface element with the specified element identifier of the specified user-device interface element and the specified server code tracing depth to configure a granular server code trace of the selected interface element including any imported code to the requested server code tracing depth. It should be noted that the updating of the ML code header may also include enabling tracing of a portion of the server code at the server as specified by the configured granular server code trace within the ML code header of source code that serves the specified user-device interface element.

At block 512, the process 500 issues an instruction to the end-user device to refresh at least the specified user-device interface element within a browser executed by the end-user device. Issuing the instruction to refresh the specified user-device interface element or web/application page may include issuing an application programming interface (API) call to the end-user device with a web page identifier of a web page that includes the specified user-device interface element with an instruction to the end-user device that causes the client device to refresh the identified web page.

At block 514, the process 500 traces the portion of the server code utilized by the specified user-device interface element as specified by the configured granular server code trace to the specified server code tracing depth. As described above, the process 500 may trace package code utilized in association with the specified user-device interface element beginning at a parent class package name and traversing back within code layers of the portion of the server code to the specified server code tracing depth. The process 500 may trace, within each traversed code layer, imported server package code utilized in association with the specified user-device interface element to the specified server code tracing depth.

At block 516, the process 500 outputs results of the granular server code trace. For example, the output of the results of the granular server code trace may be provided within a trace log file defined in association with the portion of the server code associated with the specified user-device interface element. Additionally and/or alternatively, the process 500 may output the trace results to an administrator display device or may generate other output as appropriate for a given implementation. The process 500 returns to decision point 502 and iterates as described above.

As such, the process 500 receives and authorizes server code trace requests received from user/client devices. The process 500 updates markup language (ML) code associated with the output for which the server code trace is requested with the client-side interface element identifier and the requested granular server tracing depth in response to authorization of the received server code trace request. The process 500 issues an instruction to the user/client device to refresh/re-execute the access to the server code interface, and performs the requested authorized server code trace.

As described above in association with FIG. 1 through FIG. 5, the example systems and processes provide client-configured server class tracing to a configurable threshold. Many other variations and additional activities associated with client-configured server class tracing to a configurable threshold are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer program product, comprising:
a computer readable storage medium having computer readable program code embodied therewith, where the computer readable storage medium is not a transitory signal per se and where the computer readable program code when executed on a computer causes the computer to:
display, by a browser, a displayed page;
determine an error in the displayed page;
responsive to the determination of the error, receive, using an existing select-element debug tool of the browser, first user input data comprising information indicative of an area of the displayed page, with the area including a selected web page element, with the selected web page element being one of a following group of web page element types: a portlet, a widget, an image, or web content;
responsive to the receipt of the first user input data, communicate, from the existing select-element debug tool of the browser back to an application associated with the displaying of the displayed page, a hook associated with the selected web page element;
receive second user input data comprising information indicative of a selection of a trace of code, and a depth of trace value, to be performed on the selected web page element;
trace code associated with the selected web page element at a depth corresponding to the depth of trace value; and
provide output of the tracing of the code in a trace log file.

2. The computer program product of claim 1, where the computer readable program code when executed on the computer further causes the computer to:
use the depth of trace value as a designated threshold set as a header on the displayed page.

3. The computer program product of claim 1, where the computer program product is in the form of a computer system, with the computer program product further comprising:
a processor(s) set structured, programmed, and/or connected to execute the computer readable program code stored in the computer readable storage medium.

4. A computer-implemented method, comprising:
receiving, at a server device from a user device served by the server device, a user-device configured server code trace request that specifies an element identifier of a specified user-device interface element served by the server device and a server code tracing depth specified by a user of the user device; and performing a granular server code trace of server code scoped to the specified server code tracing depth and scoped to a portion of the server code utilized in association with the specified user-device interface element.

5. The computer-implemented method of claim 4, further comprising:
extracting the specified element identifier of the specified user-device interface element and the specified server code tracing depth from the user-device configured server code trace request; and
updating a markup language code header of source code that serves the specified user-device interface element with the specified element identifier of the specified user-device interface element and the specified server code tracing depth.

6. The computer-implemented method of claim 4, further comprising:
enabling tracing of the portion of the server code at the server device as specified by the granular server code trace within a markup language code header of source code that serves the specified user-device interface element.

7. The computer-implemented method of claim 4, where performing the granular server code trace of the server code scoped to the specified server code tracing depth and scoped to the portion of the server code utilized in association with the specified user-device interface element comprises:
issuing an instruction to the user device to refresh at least the specified user-device interface element within a browser executed by the user device; and
tracing the portion of the server code utilized by the specified user-device interface element as specified by the granular server code trace to the specified server code tracing depth.

8. The computer-implemented method of claim 7, where issuing the instruction to the user device to refresh at least the specified user-device interface element within the browser executed by the user device comprises:
issuing an application programming interface (API) call to the user device with a web page identifier that identifies a web page that comprises the specified user-device interface element with the instruction to the user device that causes the user device to refresh the identified web page.

9. The computer-implemented method of claim 4, where performing the granular server code trace of the server code scoped to the specified server code tracing depth and scoped to the portion of the server code utilized in association with the specified user-device interface element comprises:
tracing package code utilized in association with the specified user-device interface element beginning at a parent class package name and traversing back within code layers of the portion of the server code to the specified server code tracing depth; and
tracing, within each traversed code layer, imported server package code utilized in association with the specified user-device interface element to the specified server code tracing depth.

10. The computer-implemented method of claim 4, further comprising providing a trace output of the granular server code trace within a trace log file defined in association with the portion of the server code associated with the specified user-device interface element.

11. A computer program product, comprising:
a computer readable storage medium having computer readable program code embodied therewith, where the computer readable storage medium is not a transitory signal per se and where the computer readable program code when executed on a computer causes the computer to:
receive, at a server device from a user device served by the server device, a user-device configured server code trace request that specifies an element identifier of a specified user-device interface element served by the server device and a server code tracing depth specified by a user of the user device; and
perform a granular server code trace of server code scoped to the specified server code tracing depth and scoped to a portion of the server code utilized in association with the specified user-device interface element.

12. The computer program product of claim 11, where the computer readable program code when executed on the computer further causes the computer to:
extract the specified element identifier of the specified user-device interface element and the specified server code tracing depth from the user-device configured server code trace request; and
update a markup language code header of source code that serves the specified user-device interface element with the specified element identifier of the specified user-device interface element and the specified server code tracing depth.

13. The computer program product of claim 11, where the computer readable program code when executed on the computer further causes the computer to:
enable tracing of the portion of the server code at the server device as specified by the granular server code trace within a markup language code header of source code that serves the specified user-device interface element.

14. The computer program product of claim 11, where, in causing the computer to perform the granular server code trace of the server code scoped to the specified server code tracing depth and scoped to the portion of the server code utilized in association with the specified user-device interface element, the computer readable program code when executed on the computer causes the computer to:
issue an instruction to the user device to refresh at least the specified user-device interface element within a browser executed by the user device; and
trace the portion of the server code utilized by the specified user-device interface element as specified by the granular server code trace to the specified server code tracing depth.

15. The computer program product of claim 14, where, in causing the computer to issue the instruction to the user device to refresh at least the specified user-device interface element within the browser executed by the user device, the computer readable program code when executed on the computer causes the computer to:
issue an application programming interface (API) call to the user device with a web page identifier that identifies a web page that comprises the specified user-device interface element with the instruction to the user device that causes the user device to refresh the identified web page.

16. The computer program product of claim 11, where, in causing the computer to perform the granular server code trace of the server code scoped to the specified server code tracing depth and scoped to the portion of the server code utilized in association with the specified user-device interface element, the computer readable program code when executed on the computer causes the computer to:
- trace package code utilized in association with the specified user-device interface element beginning at a parent class package name and traversing back within code layers of the portion of the server code to the specified server code tracing depth; and
- trace, within each traversed code layer, imported server package code utilized in association with the specified user-device interface element to the specified server code tracing depth.

17. The computer program product of claim 11, where the computer readable program code when executed on the computer further causes the computer to provide a trace output of the granular server code trace within a trace log file defined in association with the portion of the server code associated with the specified user-device interface element.

18. The computer program product of claim 11, where the computer program product is in the form of a computer system, with the computer program product further comprising:
- a processor(s) set structured, programmed, and/or connected to execute the computer readable program code stored in the computer readable storage medium.

* * * * *